US010206076B2

(12) United States Patent
Chun et al.

(10) Patent No.: US 10,206,076 B2
(45) Date of Patent: Feb. 12, 2019

(54) COMMUNICATION METHOD FOR USER EQUIPMENT IN V2X COMMUNICATION SYSTEM, AND USER EQUIPMENT

(71) Applicant: LG ELECTRONICS INC., Seoul (KR)

(72) Inventors: Sungduck Chun, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/576,662

(22) PCT Filed: Jun. 9, 2016

(86) PCT No.: PCT/KR2016/006140
§ 371 (c)(1),
(2) Date: Nov. 22, 2017

(87) PCT Pub. No.: WO2016/200184
PCT Pub. Date: Dec. 15, 2016

(65) Prior Publication Data
US 2018/0139593 A1    May 17, 2018

Related U.S. Application Data

(60) Provisional application No. 62/173,329, filed on Jun. 9, 2015.

(51) Int. Cl.
*H04W 4/44* (2018.01)
*H04W 4/12* (2009.01)
(Continued)

(52) U.S. Cl.
CPC ............... *H04W 4/44* (2018.02); *H04W 4/12* (2013.01); *H04W 4/46* (2018.02); *H04W 28/02* (2013.01); *H04W 76/27* (2018.02); *H04W 88/02* (2013.01)

(58) Field of Classification Search
CPC ...................................................... H04W 4/44
See application file for complete search history.

(56) References Cited

U.S. PATENT DOCUMENTS

| 2011/0034201 A1* | 2/2011 | Hamada ................. H04L 67/12 455/517 |
| 2012/0184321 A1 | 7/2012 | Baldessari et al. |

(Continued)

OTHER PUBLICATIONS

PCT International Application No. PCT/KR2016/006140, Written Opinion of the International Searching Authority dated Sep. 7, 2016, 19 pages.

*Primary Examiner* — Christopher M Brandt
(74) *Attorney, Agent, or Firm* — Lee, Hong, Degerman, Kang & Waimey PC

(57) ABSTRACT

Disclosed are a communication method and user equipment (UE), wherein the method: receives settings information including parameters for instructing message transmission; checks the number of messages that have been transmitted during a predetermined time period according to the parameters when new messages are generated; transmits the new messages when the number of messages is less than a number instructed by the parameters; and deletes the new message when the number of messages is the number instructed by the parameters.

14 Claims, 10 Drawing Sheets

(51) Int. Cl.
*H04W 4/46* (2018.01)
*H04W 76/27* (2018.01)
*H04W 28/02* (2009.01)
*H04W 88/02* (2009.01)

(56) References Cited

U.S. PATENT DOCUMENTS

2013/0336120 A1   12/2013   Bai
2014/0045556 A1*   2/2014   Subramanian .... H04W 52/0251
                                                     455/574
2015/0117335 A1    4/2015   Jeng et al.

* cited by examiner

COMMUNICATION METHOD FOR USER EQUIPMENT IN V2X COMMUNICATION SYSTEM, AND USER EQUIPMENT

CROSS-REFERENCE TO RELATED APPLICATIONS

This application is the National Stage filing under 35 U.S.C. 371 of International Application No. PCT/KR2016/006140, filed on Jun. 9, 2016, which claims the benefit of U.S. Provisional Application No. 62/173,329, filed on Jun. 9, 2015, the contents of which are all hereby incorporated by reference herein in their entirety.

TECHNICAL FIELD

The present invention relates to a wireless communication system, and more particularly, to a communication method performed by a user equipment in a vehicle to everything (V2X) communication system and user equipment for the same.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Problems

An object of the present invention is to provide a communication mechanism between a user equipment (UE) and a network entity in a V2X communication system.

Another object of the present invention is to efficiently improve an operating method for a UE such that the UE can operate properly for the features of V2X communication in various V2X communication environments.

A further object of the present invention is to provide a mechanism capable of managing QoS properly for V2X communication, limiting access from a UE, or controlling the use of resources.

The technical problems solved by the present invention are not limited to the above technical problems and other technical problems which are not described herein will become apparent to those skilled in the art from the following description.

Technical Solutions

To achieve these objects and other advantages, in an aspect of the present invention, provided herein is a communication method, including: receiving configuration information including a parameter indicating transmission frequency of messages; when a new message is generated, checking the number of messages that have been transmitted during a predetermined time period according to the parameter; and when the number of the messages is less than a number indicated by the parameter, transmitting the new message; or when the number of the messages is equal to the number indicated by the parameter, deleting the new message.

The parameter may indicate a maximum number of messages that can be transmitted during the predetermined time period.

When the transmission frequency indicates No Limit, the new message may be transmitted even though the number of the messages is equal to the number indicated by the parameter.

The communication method may further include delivering the received configuration information to an application. When the number of the messages is equal to the number indicated by the parameter, the application may not generate a message any more.

The configuration information may further include information a speed standard where the parameter will be applied. When the speed standard is satisfied, the parameter may be considered according to the generation of the new message. On the contrary, when the speed standard is not satisfied, the parameter may be ignored.

When the UE is configured to use, among controlled allocation resources and autonomously selected resources, the autonomously selected resources, the configuration information may be received.

The messages may be V2X (vehicle to everything) messages generated in a V2X application, the configuration information may be V2X configuration information, and the UE may perform V2X communication with the network entity.

In another aspect of the present invention, provided herein is a user equipment (UE), including: a transmitter, a receiver, and a processor connected to the transmitter and the receiver. In this case, the processor may be configured to receive configuration information including a parameter indicating transmission frequency of messages; when a new message is generated, check the number of messages that have been transmitted during a predetermined time period according to the parameter; when the number of the messages is less than a number indicated by the parameter, transmit the new message; and when the number of the messages is equal to the number indicated by the parameter, delete the new message.

Advantageous Effects

As is apparent from the above description, the embodiments of the present invention have the following effects.

First, a UE can perform efficient V2X communication with network entities in a V2X communication system.

Second, a UE can operate properly for the features of V2X communication, thereby efficiently improving performance of the V2X communication.

Third, it is possible to stably secure V2X communication for traffic safety.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
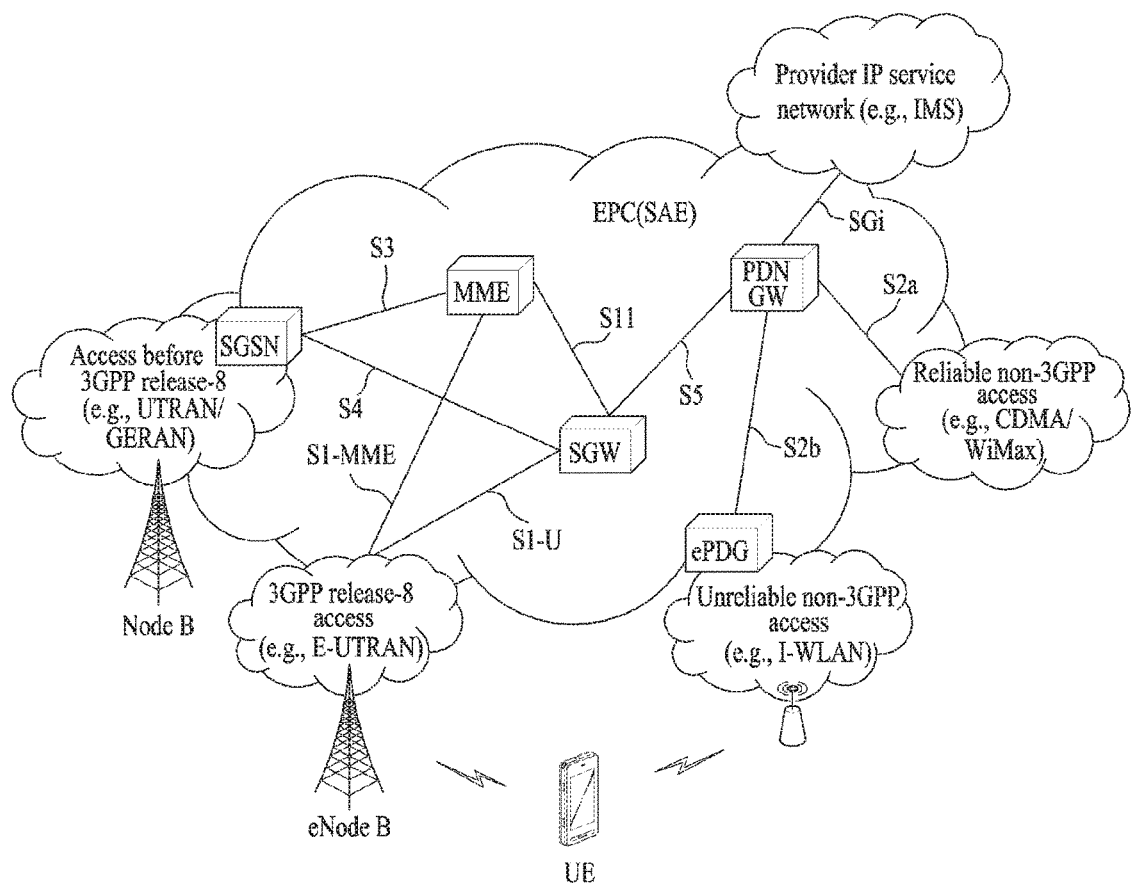
FIG. 1 is a diagram illustrating a brief structure of an evolved packet system (EPS) that includes an evolved packet core (EPC).

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

First of all, the terms used in this specification can be defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a protocol defined by the operator to indicate which one will be used by the UE for routing of IP traffic among several radio access interfaces. The ISRP may include three types of protocols as follows, as a policy for defining an access network preferred (i.e., having a high priority) or restricted to route/steer a packet service (or an IP flow or IP traffic or applications). That is, the ISRP may be divided into an IP flow mobility (IFOM) protocol, a multi access PDN connectivity (MAPCON) protocol, and a non-seamless WLAN offload (NSWO) protocol as follows.

IFOM (IP Flow Mobility) protocol: This protocol is in regards to a list in which access technologies/access networks to be used by the UE are arranged according to a priority, when traffic matched to a specific IP traffic filter can be routed on a specific APN or on a random APN. Further, this protocol may designate for which radio access the traffic matched to the specific IP traffic filter is limited on the specific APN or on the random APN.

MAPCON (Multi Access PDN Connectivity) protocol: This protocol is a list in which the access technologies/access networks to be used by the UE are arranged according to the priority when a PDN connection for the specific APN can be routed. Further, this protocol may designate for which radio access a PDN connection to a specific APN will be limited.

NSWO(Non-seamless WLAN offload) protocol: This protocol designates whether certain traffic will be offloaded or not offloaded non-seamlessly to a WLAN.

ISMP (Inter-System Mobility Policy): This is a set of protocols defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
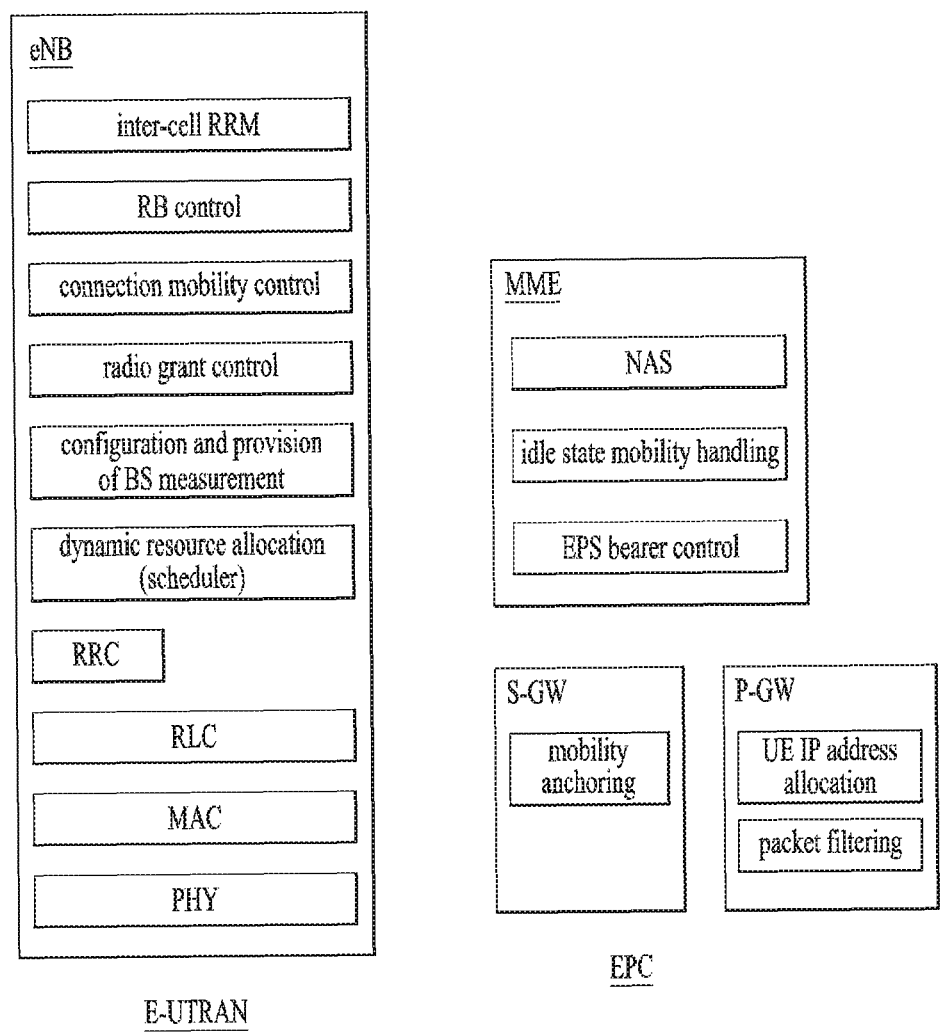
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
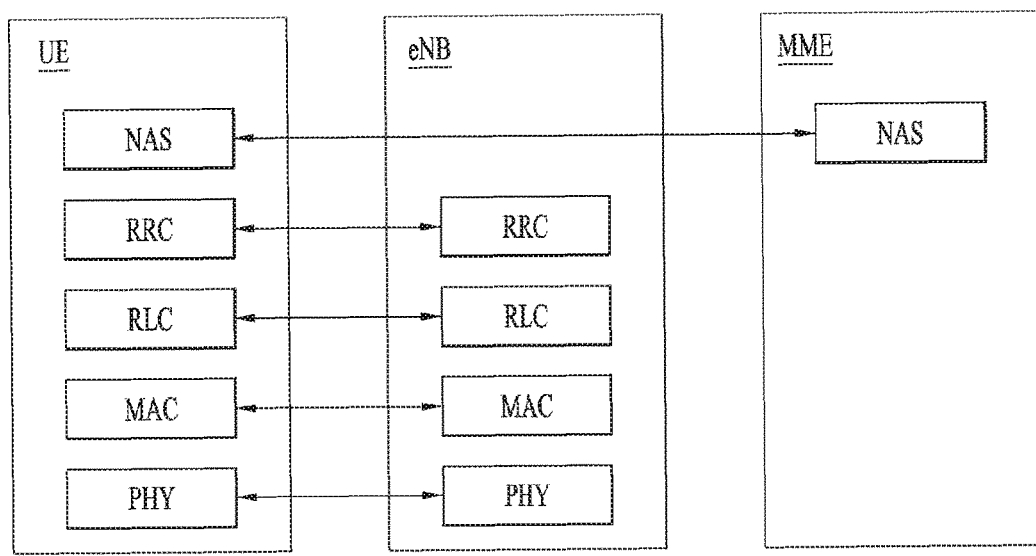
FIG. 3 is an exemplary diagram illustrating a structure of a radio interface protocol on a control plane.
Figure 4:
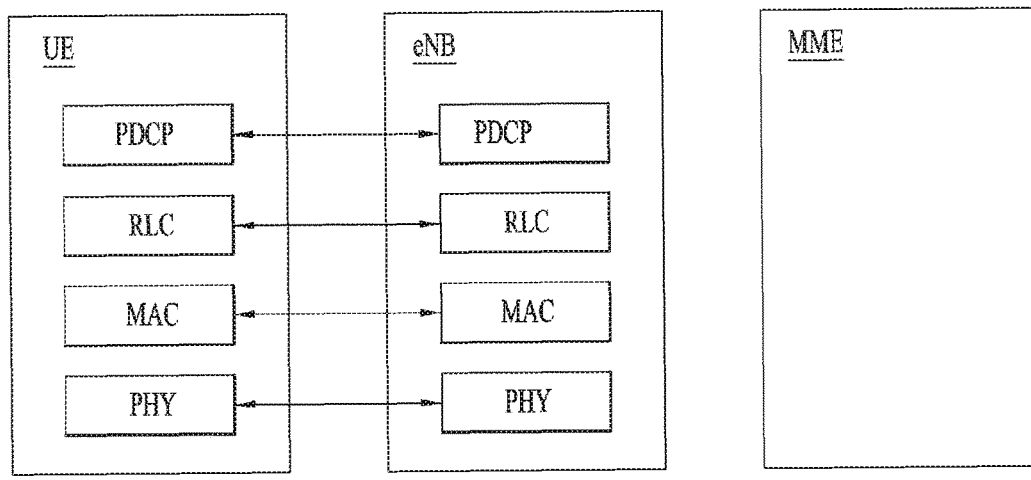
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
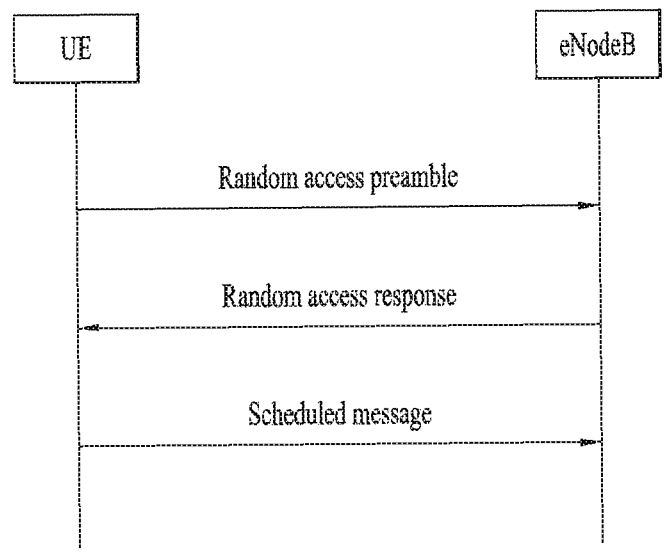
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB transmits a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
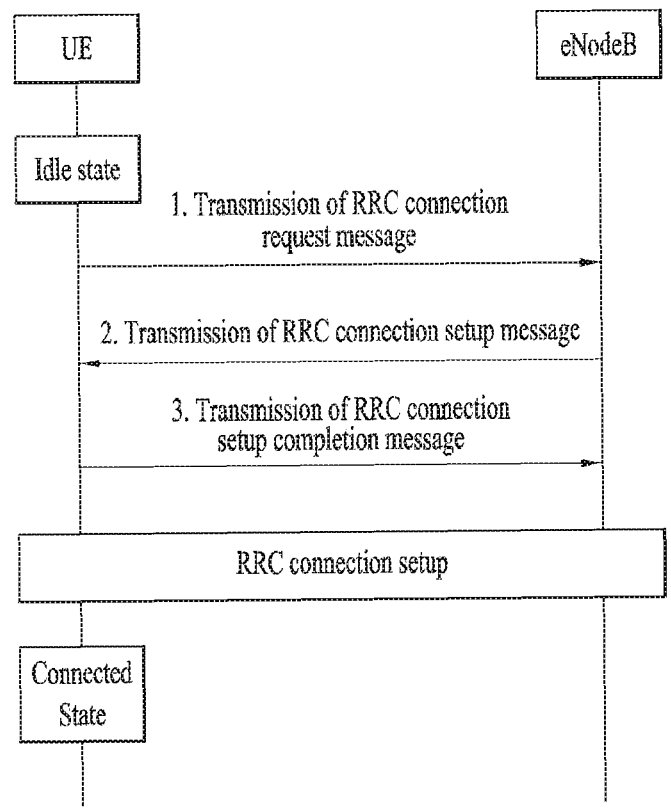
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

When the UE in the idle state desires to establish RRC connection for reasons such as an attempt to make a call, a data transmission attempt, or a response of the eNodeB to paging, the UE transmits an RRC connection request message to the eNodeB first.

Upon receiving the RRC connection request message from the UE, the ENB accepts the RRC connection request of the UE when the radio resources are sufficient, and then transmits an RRC connection setup message, which is a response message, to the UE.

Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. V2X (Vehicle to Everything) Communication

Figure 7:
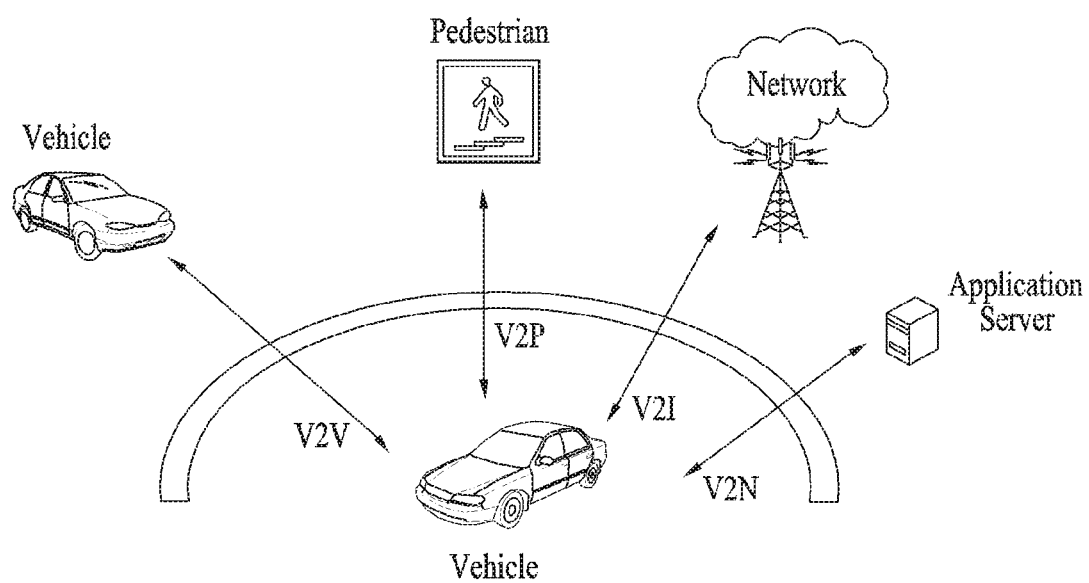
FIG. 7 is a diagram showing a V2X (vehicle to everything) communication environment.

FIG. 7 is a diagram showing a V2X (vehicle to everything) communication environment.

If a vehicle accident occurs, many lives are lost and serious property damage is caused. Hence, the demand for a technology capable of securing pedestrian's safety as well as vehicle boarded person's safety is increasingly rising. Hence, a vehicle-specified hardware and software based technology is grafted onto a vehicle.

An LTE based V2X (vehicle-to-everything) communication technology having started from 3GPP reflects the tendency of grafting an IT (information technology) technology onto a vehicle. Connectivity function is applied to some kinds of vehicles, and many efforts are continuously made to research and develop V2V (Vehicle-to-Vehicle) communication, V2I (Vehicle-to-Infrastructure) communication, V2P (Vehicle-to-Pedestrian) communication, and V2N (Vehicle-to-Network) communication through evolution of communication functions.

According to V2X communication, a vehicle consistently broadcasts information on its own locations, speeds, directions, etc. Having received the broadcasted information, a nearby vehicle utilizes the information for accident prevention by recognizing movements of other vehicles moving nearby.

Namely, in a similar manner that an individual person carries a user equipment in shape of a smartphone, a smartwatch or the like, a user equipment (hereinafter abbreviated UE) in specific shape is installed in each vehicle. Here, a UE installed in a vehicle means a device actually provided with a communication service from a communication network. For example, the UE installed in the vehicle can be provided with a communication service by being connected to an eNB.

Yet, various items should be considered for a process for implementing V2X communication in a vehicle. This is because astronomical costs are required for the installation of traffic safety facilities such as V2X base station and the like. Namely, in order to support V2X communication on all vehicle-movable roads, it is necessary to install hundreds or thousands of V2X base stations or more. Moreover, since each network node accesses Internet or a central control server using a wired network basically for stable communication with a server, installation and maintenance costs of the wired network are high.

Prior to the description of the proposed V2X communication method, several kinds of terms to be used in the following specification are defined first.

RSU (road side unit): This is an entity supportive of V2I communication and means an entity capable of performing a transmission/reception to/from a UE using a V2I application. The RSU can be implemented in an eNB or UE (particularly, a stationary UE). An eNB or UE operating as RSU collects information (e.g., traffic light information, traffic volume information, etc.) related to traffic safety and/or information on nearby vehicle movement, transmits information to another UE becoming a target of V2I communication, and receives information from another UE.

V2I communication: This is a type of V2X communication. A UE and RSU that use V2I application become main agents of the communication.

V2N communication: This is a type of V2X communication. A UE and serving entity that use V2N application become main agents of the communication and communicate with each other through an LTE network entity.

V2P communication: This is a type of V2X communication. Two UEs that use V2P application become main agents of the communication.

V2V communication: This is a type of V2X communication. Two UEs that use V2V application become main agents of the communication. V2V communication differs from V2P communication in the following. In the V2P communication, a prescribed UE becomes a UE of a pedestrian. In the V2V communication, a prescribed UE becomes a UE of a vehicle.

Uu interface (or, E-UTRAN Uu interface): This means an interface between a UE and an eNB defined in LTE/LTE-A. With respect to a relay node, this interface may mean an interface between a relay node and a UE.

Un interface: This means an interface between a relay node and an eNB. This interface means an interface used for transmission and reception performed in MBSFN (MBMS (multimedia broadcast/multicast services) over single frequency network) subframe.

PC5 interface: This means an interface used for direct communication between two UEs. This interface is used for communication between devices supportive of ProSE (proximity service).

DSRC (dedicated short range communications): This means a protocol and standard specification used for short-range or medium-range wireless communication for vehicles. Communication is performed using an interface different from the Uu, Un and PC5 interfaces.

Hereinafter, multiple scenarios and embodiments of the proposed V2X communication method therefor will be described with reference to FIGS. 8 to 11.

3. Proposed V2X Communication Method

Among the above-described various V2X services, the purposed of V2V communication is information exchange between vehicles. Thus, the main purpose of the V2V communication is to prevent accidents by enabling vehicles driving on the road to exchange information such as their positions, speeds, directions and the like.

To support V2V direction communication between vehicles, a method in which a centralized server collects a plurality of pieces of information generated in individual vehicles and then retransmits the collected information to each UE or UE group can be considered. For example, in the case of a navigation application, each UE transmits information on its location and destination to an application server, and the application server informs each UE of a path for each UE using map information. In this case, since the application server collects information on locations and destinations of all vehicle UEs, the application server can minimize traffic congestion by distributing paths of the vehicles. Thus, a method in which the centralized server manages information for vehicle safety in the similar manner can also be considered.

However, the method in which the centralized server collects driving information of all vehicle UEs and then informs the driving information to each of the vehicle UEs has limitations. First, since the information of all the UEs is transmitted to the server, transmission latency occurs, and thus, the traffic information may not be transmitted to each UE at the proper time. In addition, each UE may receive an unnecessarily large amount of information. For example, when a vehicle moves at a speed of 100 km/h, the vehicle moves a distance 100 m in about 3.6 seconds. Considering that safety is the main purpose, traffic information on vehicles within a radius of 500 m is sufficient for the vehicle UE. However, when the UE receives information from the centralized server, the UE receives information on a vehicle far away from the UE, and it may cause a side effect that the calculation amount of the vehicle UE is unnecessarily increased.

Second, the concept of a cell is necessarily introduced in the cellular communication system. Whenever a UE goes through each cell, transmission interruption occurs during a short time due to handover. Considering that traffic information is for accident prevention and safety, the transmission interruption may cause a problem even though it occurs during the short time.

Therefore, in the cellular system, a method in which vehicle UEs directly exchange information with each other instead of receiving information from an eNB or network can be considered for efficient information transmission and reception between vehicles. To this end, a method of using PC5 interface defined in ProSe can be considered. When sidelink (SL) communication, which is defined for the communication using the PC5 interface, is used, a UE can transmit and receive data to and from another UE without an eNB or network entity, and thus, the transmission latency can be reduced. In addition, since a UE can transmit its information to adjacent UEs within a predetermined distance from the UE, it is possible to prevent the information from being transmitted to UEs which do not require the information, thereby improving transmission efficiency and security.

Meanwhile, a UE cannot arbitrarily use radio resource using the SL. Specifically, a wireless communication system, in particular, a cellular communication system operates on the basis of a cell. In this case, if a cell occupies a large amount of resources, it may cause interference to a neighboring cell, and thus, the cell cannot communicate with UEs located in the neighboring cell. In addition, since in the SL, uplink of each cell, i.e., an uplink frequency band is used, a signal transmitted from a UE that performs communication using the SL may cause interference to a signal transmitted from a different UE, in particular, an uplink signal transmitted to an eNB. Thus, an SL signal may degrade receiving sensitivity of the eNB that intends to receive the uplink signal from the different UE.

To overcome the above-mentioned problems, each cell separately allocates radio resources for the SL communication. For direction communication between UEs, an eNB may allocate separate radio resources (scheduled resource allocation), or a UE may autonomously select radio resources (autonomous resource selection).

According to the currently defined intelligent transport system (ITS) standard, a V2X application transmits 1 to 10 V2X messages in one second. The V2X message generated in the V2X application is transmitted by a lower layer that provides network connectivity through an air interface. The LTE air interface could be taken as an example of the network connectivity, and in the LTE system, an eNB manages radio resources of each cell on a cell basis.

In general, in the LTE system, a single cell configures an uplink/downlink frequency band of about 10 MHz, and the number of UEs and vehicles supported by each cell is limited. To overcome the limitation, a method in which a single cell allocates all its resources for vehicle communication, in particular, the SL and does not allocate any resources for uplink/downlink can be considered. However, from the perspective of a communication service provider, when the single cell is used only for the vehicle communication, it is difficult to provide services to users using different terminals such as smartphones.

Moreover, according to changes in speed and direction of the vehicle, the amount and period of messages such as CAM/DENM (Cooperative Awareness Message/Decentralized Environmental Notification Message) generated in the V2X application are changed. Thus, even if a certain amount of radio resources is allocated for the V2X communication, the resources may be either sufficient or insufficient depending on traffic flow. Thus, there may be a problem that variables are not fixed.

The amount of data generated in the V2X application is changed according to the number of vehicles using the V2X application and changes in the road situation in a certain cell managed by the eNB. Thus, the eNB should allow each vehicle to have appropriate transmission opportunities by managing and distributing radio resources of each cell in terms of load balancing. Meanwhile, in the case of the V2X communication, since messages related to traffic and safety are transmitted and received, transmission thereof should be guaranteed compared to the normal communication service.

In the following description, communication mechanisms in consideration of the above-described eNB's node balancing and V2X features are proposed. Specifically, processes for transmitting various types of V2X configuration information and operation processes of a UE will be described.

3.1 Embodiment 1

Figure 8:
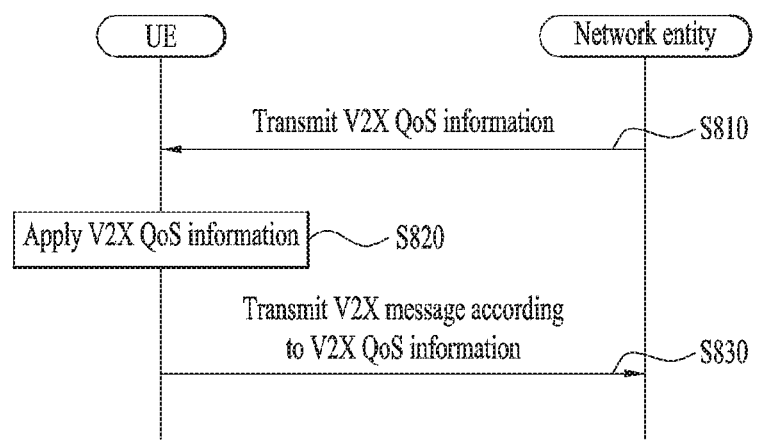
FIG. 8 is a flowchart for explaining an embodiment of a proposed V2X communication method.

FIG. 8 is a flowchart for explaining an embodiment of a proposed V2X communication method. In FIG. 8, a method in which a network entity controls QoS of a UE (i.e., a vehicle UE) will be described.

The network entity (e.g., eNB or MME) transmits, as quality information related to V2X communication, V2X QoS information to a UE that activates a V2X function [S810]. In this case, the V2X QoS information may be transmitted to the UE from the eNB through RRC signaling as an RRC message. Alternatively, it may be transmitted to the UE from the MME through NAS signaling as a NAS message. As another example, the V2X QoS information may be transmitted to the UE through MAC layer signaling using a MAC control element (CE) or RLC layer signaling using an RLC control PDU. As a further example, the V2X QoS information may be transmitted to the UE as system information (e.g., SIB).

Meanwhile, the V2X QoS information may include various information related to V2X communication. For example, the V2X QoS information may include information at least one of a data rate for V2X communication provided to a UE, a data rate for V2X communication guaranteed for a UE, a minimum data rate for a V2X service provided to a UE, a maximum data rate for a V2X service provided to a UE, a data rate for a V2X service allowed for a UE, and a maximum data rate for a V2X service allowed for a UE.

In addition, in the V2X QoS information, the aforementioned various types of information may be replaced with other values rather than the data rate. For example, the V2X QoS information may include information on a maximum size of data that can be transmitted by the UE, information indicating a time at which the UE can perform transmission, information on a transmission time interval (TTI) in which the UE can perform transmission, information on a time interval used by the UE to perform transmission.

Hereinafter, a description will be made by taking as an example the time interval included in the V2X QoS information. When a predetermined condition is satisfied, a V2X application creates a V2X message according to changes in parameters (e.g., location, speed, direction, etc.) related to movement of each vehicle. When the UE receives data from the V2X application before expiration of the time interval indicated by the V2X QoS information from when the UE transmitted the last V2X message, the UE may delay transmission of the V2X message for the corresponding data or discard the V2X message.

In other words, when receiving the V2X QoS information, the UE applies the V2X QoS information [S820] and then controls the V2X message transmission according to the value indicated by the V2X QoS information. That is, the UE transmits the V2X message based on the received V2X QoS information [S830]. In this case, the UE may transmit the V2X message at a specific data rate, in a specific time interval, at a specific time, or with a specific size.

Meanwhile, since the main purpose of the V2X communication is to exchange information for traffic and safety as described above, the delay or deletion of the V2X message should be seriously considered.

The V2X QoS information may indicate that data transmitted by the UE should be less than V2X data generated in the V2X application. This occurs mostly due to lack of resources of cells managed by the eNB. A single cell may have insufficient radio resources for V2X in the following cases: i) a case in which radio resources are first allocated for a service having a higher priority than the V2X service and the amount of the remaining radio resources is insufficient to support all V2X UEs; ii) a case in which a traffic congestion occurs; and iii) a case in which vehicles move at low speeds as in downtown areas (or a case in which a large number of V2X UEs are present in the cell).

In the first case, since it is determined that the service more important than the V2X service is present, the delay or deletion of the V2X message is unavoidable. That is, due to limited capacity of the cell, all services cannot be provided, and data more important than the V2X service is prioritized. In other words, the delay or deletion of the V2X message is unavoidable.

In the second and third cases, that is, when a traffic congestion occurs or vehicles move at low speeds, V2X data of the low-speed vehicles is relatively less important than that of high-speed vehicles. That is, in the case of high-speed driving, since a collision or accident between vehicles may cause serious damage, reliable V2X data transmission is extremely important. However, when vehicles move at high-speeds, a distance between vehicles is increased, and thus, the number of V2X vehicles in the cell is decreased. In addition, resources of the cell may not be insufficient. Thus, in the case of the high-speed vehicle, the eNB may not limit the V2X message transmission through the V2X QoS information.

On the other hand, when a traffic congestion occurs or vehicles move at low speeds, the number of vehicles in the cell is increased. In addition, due to the low speed of the vehicle, the V2X message transmitted by the UE at the predetermined time interval may not be changed frequently. In other words, when the vehicle moves at the low speed, information on its speed, location, direction included in the V2X message may not be changed frequently. Thus, even if the V2X message transmission is limited by the V2X QoS information, the effect of the limitation on safety may be extremely small.

Considering the above-mentioned matters, the V2X information may further include the following information. Besides the parameters (e.g., data rate, etc.) that limit the V2X message, the V2X QoS information may include information on a speed range and standard where the parameters for limiting the V2X message are applied, information on a speed range and standard where the maximum size of V2X data is applied, information on a speed range and standard where the time when the UE performs the V2X transmission is applied, information on a speed range and standard where the TTI in which the UE performs the V2X transmission is applied, and information on a speed range and standard where the time interval used by the UE to perform the V2X transmission is applied.

By applying the aforementioned information indicated by the V2X QoS information, the UE may transmit, delay, or delete the V2X message in a selective manner. For example, it is assumed that the eNB instructs the UE to transmit a message at an interval of 500 ms in a speed range from 0 to 60 km/h or a speed standard equal to or smaller than 60 km.

If the UE moves at a speed of 30 km/h and V2X messages are generated at 0 and 100 ms, the UE may transmit the V2X message at 0 ms. Thereafter, since the other V2X message is generated at 100 ms before expiration of 500 ms, the UE may delete the V2X message at 100 ms or delay it until 500 ms. Meanwhile, if a different V2X message is generated at 600 ms, the UE transmits the V2X message because the V2X message is generated after elapse of 500 ms from 0 ms when the first V2X message was generated. On the other hand, if the UE moves at a speed of 80 km/h, the UE does not satisfy the speed range and standard where the parameters indicated by the V2X QoS information are applied, and thus, the UE instantaneously transmits the V2X messages generated at 0, 100, and 600 ms without applying the condition for the time interval.

Through the above-described process, the UE applies the V2X QoS information transmitted from the network entity in consideration of its situation. When the predetermined conditions and standards for applying the V2X QoS information are satisfied, the UE operates according to the V2X QoS information. Even in the case of the values and parameters indicated by the V2X QoS information, if the above-described speed range and standard are not satisfied, the UE may discard or release the V2X QoS information.

Meanwhile, the UE may propose parameters for controlling the received V2X QoS information to the network entity. That is, when the UE determines that the values and parameters included in the V2X QoS information received from the network entity are not proper, the UE may transmit desired values and parameters to the network entity. The network entity may accept the values and parameters proposed by the UE or retransmit new values and parameters to the UE. Such a negotiation process may be performed several times.

Meanwhile, the UE forwards the received V2X QoS information to the higher layer or V2X application. After receiving the V2X QoS information, the V2X application may adjust the amount of information generated by itself, a generation period, and the like according to the received values or parameters. That is, the V2X application adjusts the amount of data generated therein not to exceed the data rate indicated by the V2X QoS information. In other words, the UE does not perform the V2X transmission in excess of the indicated data rate.

For example, when the data rate indicated by the V2X QoS information is X Mbps, the V2X application does not generate data in excess of X Mbps. However, even if the amount of data generated by the V2X application is (X+Y) Mbps, the UE deletes Y Mbps of data, which exceeds the data rate indicated by the V2X QoS information, to satisfy the data rate indicated by the V2X QoS information.

As described above, the V2X QoS information may be transmitted to the UE through RRC signaling, NAS signaling, RLC layer signaling, MAC layer signaling, or SIB. Table 2 below shows an example of an SIB configuration when the V2X QoS information is included in the SIB.

TABLE 2

ASN1STARTSystemInformationBlockType18-r12 ::= SEQUENCE
{commConfig-r12 SEQUENCE {commRxPool-r12
SL-CommRxPoolList-r12,commTxPoolNormalCommon-r12
SL-CommTxPoolList-r12 OPTIONAL, -- Need ORcommTxPoolExceptional-r12
SL-CommTxPoolList-r12 OPTIONAL, -- Need ORcommSyncConfig-r12
SL-SyncConfigList-r12 OPTIONAL -- Need OROPTIONAL- Need OR V2X QoS
Info SEQUENCE {OPTIONAL- Need OR Minimal V2X Tx Interval OPTIONAL-
Need OR Maximum V2X Tx Rate}}

3.2 Embodiment 2

Figure 9:
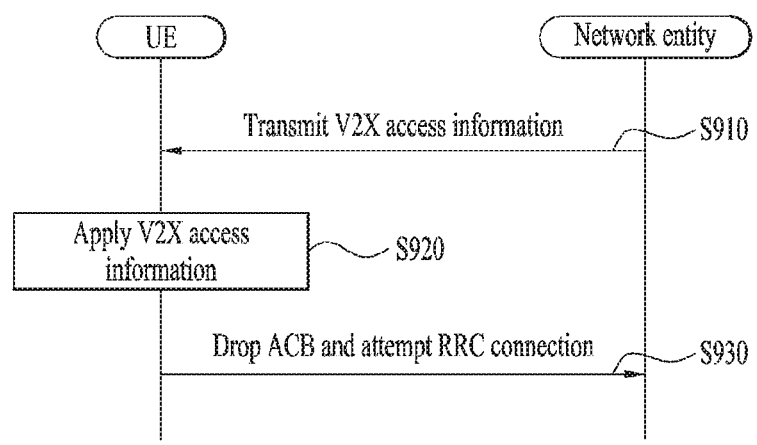
FIG. 9 is a flowchart for explaining another embodiment of the proposed V2X communication method.

FIG. 9 is a flowchart for explaining another embodiment of the proposed V2X communication method.

When a service provider simultaneously provides communication services to users using other terminals such as smartphones different from vehicle UEs and users of V2X UEs in the same cell, the radio resource problem can be solved by controlling a method for allowing the vehicle UEs to share radio resources allocated for V2X. However, this method can be applied only when sidelink resources are used.

Thus, when an eNB should provide a V2X service using the UL/DL communication scheme, the method cannot be applied. As examples of the above-described case, the following cases are considered: a case in which the eNB provides a service for the purpose of overhearing like performing lawful interception on the V2X service; a case in which V2X communication through PC5 interface is disabled due to malfunction of the PC5 interface; and a case in which V2X radio resources required for the V2X service using the PC5 interface are insufficient due to an increase in the number of UEs in the cell.

In the above-described cases, the V2X service should be provided through Uu interface using UL/DL. In particular, even when the cell has insufficient radio resources, the access delay in the UL/DL communication scheme should be minimized because the main purpose of the V2X service is to guarantee safety between vehicles and prevent accidents The object of the proposed embodiment is to prevent a situation in which access of a V2X UE is delayed due to access class barring (ACB) and the like. First, the network entity (e.g., eNB or MME) transmits V2X access information to the UE [S910]. The V2X access information may include information indicating whether the vehicle UE should apply ACB in the course of transition to an RRC connected mode. In this case, the V2X access information may be transmitted to the UE through any one of RRC signaling, NAS signaling, MAC layer signaling, RLC layer signaling, and RRC system information.

After receiving the V2X access information, the UE applies the V2X access information [S920]. When the V2X access information indicates that ACB will be applied and when access is allowed according to ACB, the UE using the PC5 interface attempts RRC connection in the course of the transition to the RRC connected mode. On the contrary, when the V2X access information indicates that ACB will not be applied, the UE omits ACB and then attempts to the RRC connection [S930].

That is, when the higher layer requests to establish the RRC connection, the UE in an RRC idle mode initiates the transition to the RRC connected mode. Upon initiation of the procedure, if SystemInformationBlockType2 includes the V2X access information, the V2X access information includes an 'AccessClassBarringSkipForV2X' parameter, and the higher layer indicates that the access is for V2X communication, the UE recognizes that access to the cell is not barred (Upon initiation of the procedure, the UE shall: SystemInformationBlockType2 includes V2X-Access-Info and V2X-Access-Info includes ac-BarringSkipForV2X and upper layer indicates that the access is for V2X communication: consider access to the cell as not barred).

3.3 Embodiment 3

Figure 10:
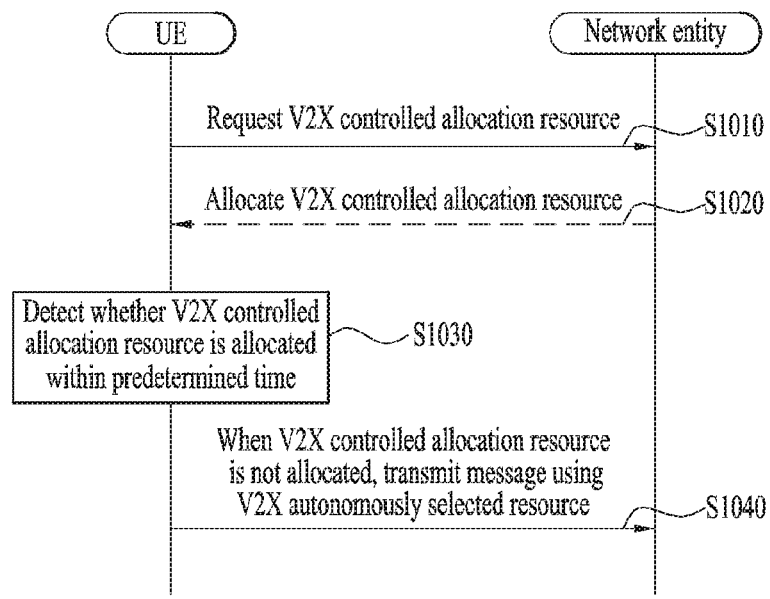
FIG. 10 is a flowchart for explaining still another embodiment of the proposed V2X communication method.

FIG. 10 is a flowchart for explaining still another embodiment of the proposed V2X communication method.

A network entity should be able to provide minimum QoS to a vehicle UE. Since a message generated in a V2X application is information on vehicle safety and traffic and it has high importance, the vehicle UE should be able to transmit the V2X message even in the case of lack of resources.

In consideration of the features of V2X communication, the network entity manages resources of the cell by dividing the resources into autonomously selected resources for V2X and controlled allocation resources for V2X. Here, the autonomously selected resources for V2X means that the vehicle UE directly select resources to be used by the vehicle UE, and the controlled allocation resources for V2X means that the network entity designates resources to be used by individual vehicle UEs. If the vehicle UE is configured to use the controlled allocation resources for V2X, the network entity allocates resources necessary for the vehicle UE to transmit the V2X message in every transmission or at a predetermined period.

However, when the cell has insufficient resources, the network entity may not allocate resources to the vehicle UE at proper timing. According to an embodiment, when the vehicle UE fails to receive the controlled allocation resources for V2X within a predetermined time [S1020] after requesting the controlled allocation resources for V2X [S1010], the vehicle UE selects resources to be used by itself from among the autonomously selected resources for V2X and then transmits the V2X message. That is, when the UE detects that the requested controlled allocation resources for V2X are not allocated within the predetermined time [S1030], the UE may use resources randomly selected from a pool of the autonomously selected resources for V2X for the V2X message transmission [S1040].

Meanwhile, even though a UE requests an eNB to allocate radio resources for V2X message transmission (i.e., controlled allocation resources), the UE may not be allocated the radio resources for the V2X message transmission within a predetermined time in the following cases.

First, there may be a case in which although the UE determines that the UE has been correctly transmitted the radio resource allocation request message (e.g., buffer status report (BSR) message), the eNB does not correctly receive the message. That is, although the eNB has been transmitted HARQ NACK in response to the request message from the UE, the UE may determine that the UE has been received HARQ ACK due to errors in the wireless end. Alternatively, although the eNB has been transmitted a message for allocating the controlled allocation resources for V2X, the UE may not receive the message. In this case, since there is no UE that transmits the V2X message through radio resources indicated by the message for allocating the controlled allocation resources for V2X, the eNB fails to decode the corresponding resources. In this case, the eNB may not accurately determine the reason for failure, i.e., whether the eNB fails to receive the message although the UE has been transmitted the message or the UE has not been transmitted the message. Further, even though the eNB correctly receives the radio resource request from the UE, the eNB may not transmit the radio resource allocation message to the UE due to the lack of the resources of the cell (for example, when there are many requests from emergency UEs such as a police vehicle, an ambulance, etc., which are determined to have higher priorities than the V2X vehicle UE or when resources cannot be allocated all the UEs because the cell does not have sufficient resources).

In addition, the above-described predetermined time for determining whether the controlled allocation resources are allocated can be determined according to the V2X QoS information described in the embodiment 1. That is, the UE waits for the V2X resource allocation during the maximum time period that satisfies the data rate, transmission time interval, and the like in accordance with the V2X QoS information. After elapse of the corresponding time interval, the UE may use the autonomously selected resources for V2X.

Meanwhile, when the UE arbitrarily uses the autonomously selected resources for V2X as described above, the network entity may inform the vehicle UE whether the UE can use the autonomously selected resources for V2X to prevent misuse or abuse of the autonomously selected resources for V2X.

For example, in the case of a vehicle UE configured not to use the controlled allocation resources for V2X, the vehicle UE may use the autonomously selected resources for V2X. As another example, in the case of a vehicle UE configured to use the controlled allocation resources for V2X, the UE may use the autonomously selected resources for V2X if predetermined standards or conditions are satisfied. As a further example, among vehicle UEs configured to use the controlled allocation resources for V2X, only a vehicle UE allowed by the network entity may use the autonomously selected resources for V2X if predetermined standards or conditions are satisfied.

The predetermined standards or conditions may include: i) a case in which after requesting the network entity to allocate resources for transmitting the message of the V2X application, the vehicle UE does not receive the allocated resources within a predetermined time; ii) a case in which a specific message is generated in a V2X application with specific priority; and iii) a case in which a predetermined time elapses after the previous transmission was performed using the autonomously selected resources for V2X. In addition, at least one of the aforementioned examples can be combined. Moreover, information on the standards and conditions related to the use of the autonomously selected resources for V2X may be transmitted by the network entity to the UE.

Meanwhile, the aforementioned radio resource allocation request message may be implemented as a BSR. After data of the V2X application is received, the UE triggers the BSR and then transmits the BSR to the eNB. Thereafter, a retx-BSR-TimerSL timer is operated (i.e., a sidelink Buffer Status Report shall be triggered if any of the following events occur: retx-BSR-TimerSL expires and the retx-BSR-TimerSL was started due to the arrival of data for V2X application). If the radio resources for the V2X message transmission are allocated, the retx-BSR-TimerSL timer is stopped. However, if the radio resources are not allocated and the retx-BSR-TimerSL timer is expired, the UE may select resources from among radio resources allocated for the autonomous selection process and then transmit the V2X message using the selected resources (i.e., (When retx-BSR-TimerSLexpires and the retx-BSR-TimerSL was started due to the arrival of data for V2X, UE select a resource among a V2X radio resource assigned for UE autonomous resource selection procedure).

Meanwhile, as described above, the eNB may previously inform the pool of the autonomously selected resources for V2X, which will be used when the conditions and standards for using the autonomously selected resources for V2X are satisfied, of the UE. Table 3 below shows an example in which the pool of the autonomously selected resources for V2X is previously informed the UE as the SIB.

In Table 3, a 'V2XcommTxPoolNormalCommon' parameter indicates resources allowed to be used for SL communication for V2X when after requesting radio resources for the SL communication, a UE fails to receive allocation of the resources within a predetermined time (i.e., the parameter indicates the resources by which the UE is allowed to transmit sidelink communication for V2X communication, when the UE is not allocated with radio resource for sidelink communication within configured time after requesting radio resources).

According to the above-described embodiment, when resources are not allocated to the UE within the predetermined time even though the UE transmits an SL BSR for the V2X message transmission, the UE uses the autonomously allocated resources for V2X. In this case, the UE may request to allocate the resources for the V2X message transmission in the RRC connected mode and also use the autonomously allocated resources for V2X in the RRC connected mode. That is, it could be interpreted to mean that the UE temporarily uses the autonomously selected resources for V2X according to a controlled allocation scheme that operates in the RRC connected mode. In addition, if a new V2X message to be transmitted is generated after the UE transmits the V2X message using the autonomously selected resources for V2X, the UE requests the eNB to allocate radio resources by transitioning to the controlled allocation scheme in order to transmit the new V2X message. In this case, if the radio resources are not allocated within the predetermined time, the UE may use the autonomously selected resources for V2X again for the new V2X message. Moreover, if the number of times of V2X message transmission that is performed temporarily using the autonomously selected resources for V2X is greater than a prescribed number, the UE determines that the current controller allocation scheme is problematic and then informs the eNB of that fact. By doing so, the eNB may adjust parameters used for the controlled allocation scheme or radio configuration parameters.

3.4 Embodiment 4

Figure 11:
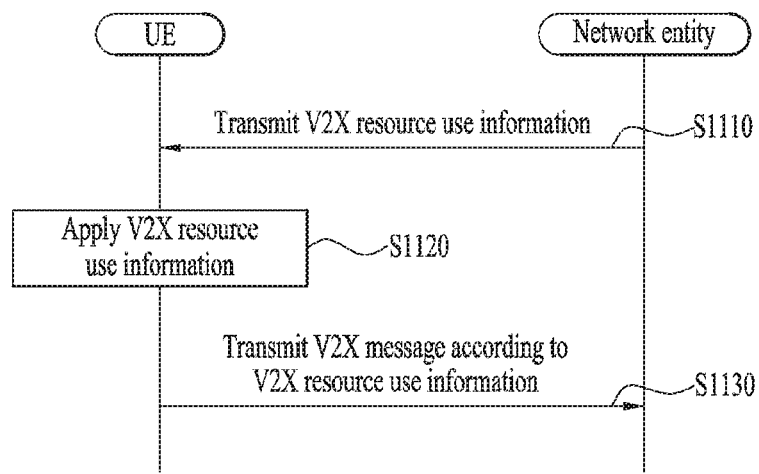
FIG. 11 is a flowchart for explaining a further embodiment of the proposed V2X communication method.

FIG. 11 is a flowchart for explaining a further embodiment of the proposed V2X communication method.

As described above with reference to FIG. 8 and the embodiment 1, a network entity can control QoS by reflecting a cell load in supporting a V2X application. That is, the network entity may control V2X message transmission by considering a cell load status. When the network entity that manages resources of the cell transmits information on autonomously selected resources for V2X to a UE, the network entity may additionally transmit information on the use of the autonomously selected resources for V2X (hereinafter referred to as 'V2X resource use information') to the UE [S1110].

According to an embodiment, the V2X resource use information may include information on at least one of a

TABLE 3

ASN1STARTSystemInformationBlockType18-r12 ::= SEQUENCE
{commConfig-r12 SEQUENCE {commRxPool-r12
SL-CommRxPoolList-r12,commTxPoolNormalCommon-r12
SL-CommTxPoolList-r12 V2X-commRxPool-r12 SL-CommRxPoolList-r12,V2X-
commTxPoolNormalCommon-r12 SL-CommTxPoolList-r12 OPTIONAL, -- Need
ORcommTxPoolExceptional-r12 SL-CommTxPoolList-r12 OPTIONAL, -- Need
ORcommSyncConfig-r12 SL-SyncConfigList-r12 OPTIONAL -- Need OR V2X resource use factor, V2X resource inactivity period, V2X resource wait period, V2X message TX factor, and V2X message TX frequency.

Hereinafter, details of the information will be described. The V2X resource use factor is a value or parameter used while the UE checks whether V2X resources are available. Upon reception of the V2X resource use factor, the UE generates a random number to be used when transmitting a message generated in a V2X application layer, compares the random number and the V2X resource use factor, and then determines whether to transmit the V2X message. That is, when the generated random number is greater than the V2X resource use factor, the UE performs the V2X message transmission using the V2X resources. On the contrary, when the random number is smaller than the V2X resource use factor, the UE does not perform the V2X message transmission. It can be implemented in the opposite way. The V2X resource use factor may have a value in the range of 0 to 1, and the random number may also have a value in the same range (for example, when the V2X resource use factor is 0.5 and the random number is 0.3, the UE does not perform the transmission using the V2X resources).

The V2X resource inactivity period is a value or parameter indicating a time period which the UE should wait for to use V2X resources again after using V2X resources. When the UE performs transmission using the V2X resources, the UE can attempt new V2X transmission after elapse of a time indicated by the V2X resource inactivity period from the time when the UE performs the corresponding transmission.

The V2X resource wait period is a value or parameter indicating a time period for checking whether the UE can use the V2X resources again. If it is determined that the UE cannot use the V2X resources during the process in which whether the transmission will be performed is determined using the V2X resource use factor, the UE should wait for the time period indicated by the V2X resource wait period to attempt a new process for determining whether to perform the transmission.

The V2X message TX factor is a value or parameter indicating a ratio of the number of messages that can be actually transmitted to the number of messages delivered from the V2X application. The UE transmits messages selected from among the message generated in the V2X application according to the ratio indicated by the V2X message TX factor. For example, when the V2X message TX factor is 0.8, the UE transmits eight messages among a total of ten V2X messages generated in the V2X application and then deletes the two remaining messages.

The V2X message TX frequency/rate is a value or parameter indicating the number of messages that can be generated by the V2X application. Alternatively, the V2X message TX frequency is a value or parameter indicating the number of V2X messages that can be transmitted by the UE during a prescribed time period. For example, upon reception of the V2X message TX frequency, the UE may control the V2X application not to generate V2X messages in excess of the number indicated by the V2X message TX frequency by informing the V2X message TX frequency. Alternatively, when the V2X message TX frequency is 3, the UE may be configured not to transmit three or more V2X messages in one second. That is, the V2X message TX frequency may indicate the number of V2X messages that can be transmitted by the UE within a prescribed time. The above-described one second or three messages are merely examples, and the time interval and the number of the messages may have different values.

Figure 12:
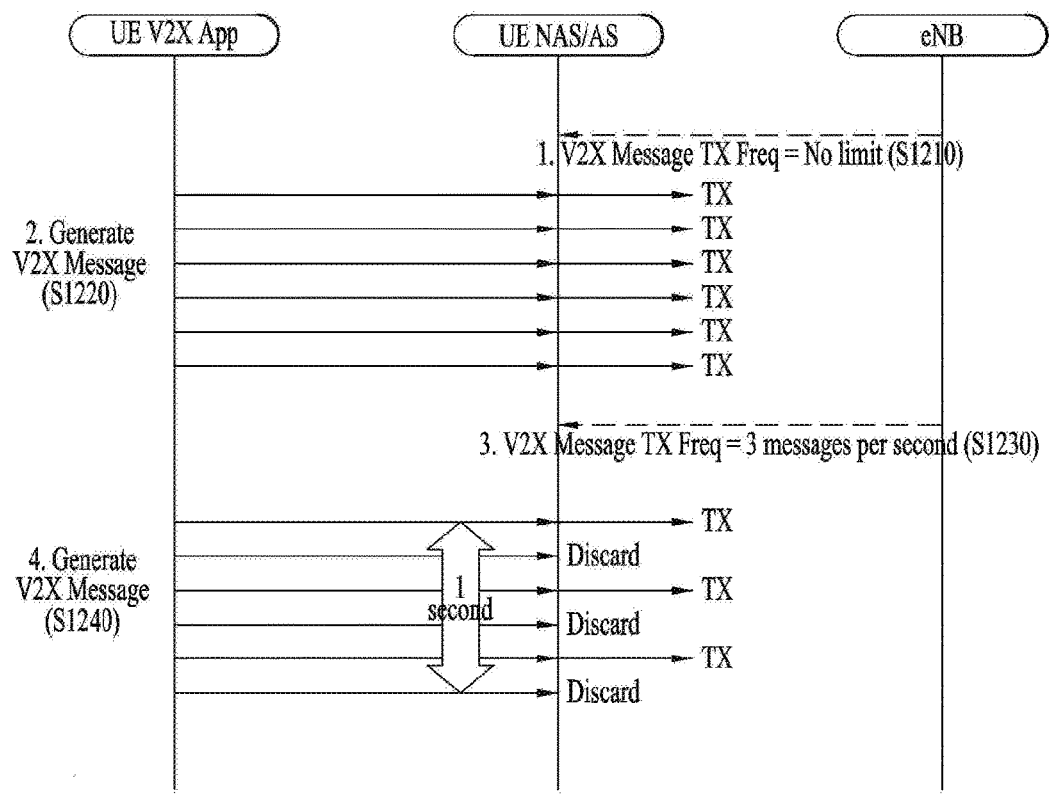
FIG. 12 is a flowchart for explaining a still further embodiment of the proposed V2X communication method.
Figure 13:
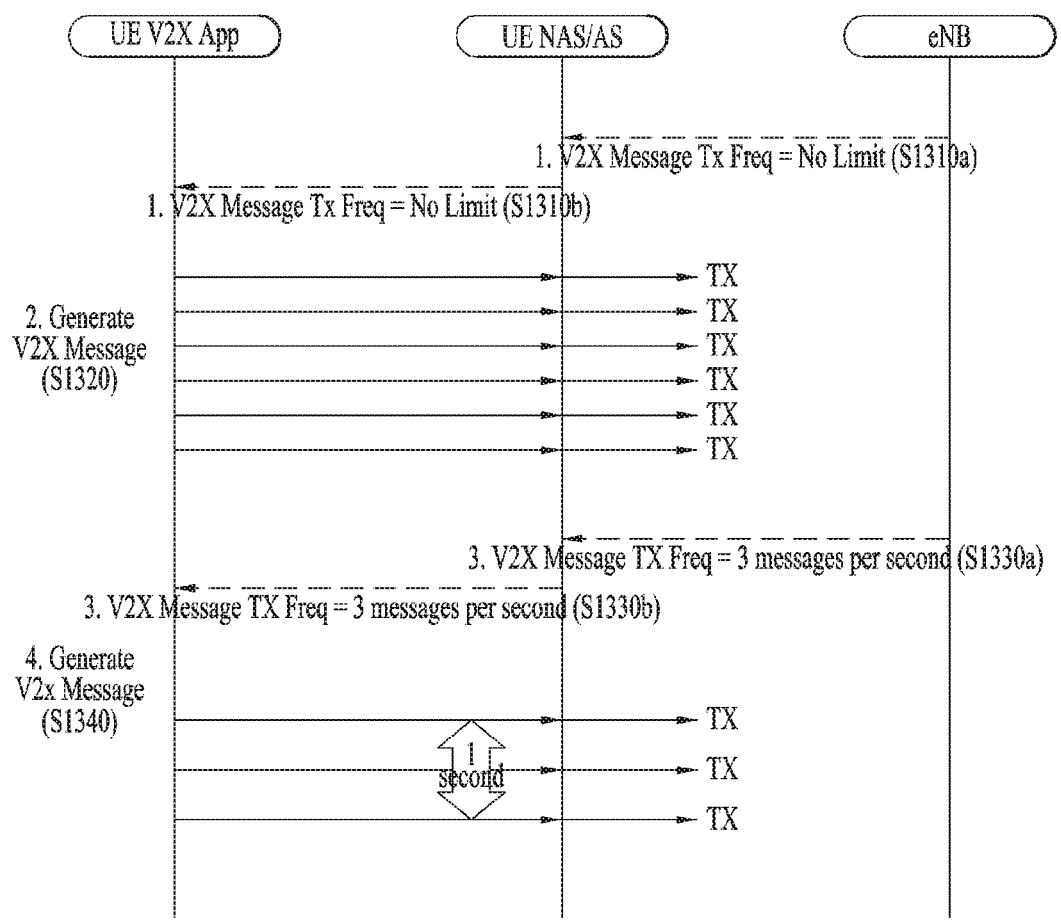
FIG. 13 is a flowchart for explaining a yet further embodiment of the proposed V2X communication method.

With reference to FIGS. 12 and 13, the V2X message TX frequency will be described in detail.

Referring to ETSI TS 302 637-2 and 637-3 related to V2X communication, most of messages have sizes in the range of 50 to 300 bytes. Even in consideration of an intersection, it has a size of about 1200 bytes. In addition, even when the message generation frequency is increased due to significant changes in speeds and directions of vehicles, ten or more messages are rarely generated every one second. That is, from the perspective of the LTE/LTE-A communication system supporting 100 Mbps or more, the size of the V2X message is considered as a very small number, and thus, it would be inappropriate to indicate QoS of the V2X communication in the unit of bps.

In this regard, the introduction of a new unit or standard for indicating the QoS is required. Details will be described with reference to FIGS. 12 and 13.

The CAM and DeNM are considered as examples of the frequently used V2X application, and in the two applications, ten messages are generated and transmitted in one second. However, in the case of an area where traffic congestion occurs, an area where vehicles moves at low speeds, or an area where an eNB has an excessively large load, a cell managed by the network may not support that all vehicles generate ten messages every one second. If all the vehicles transmit all the generated V2X messages, it may cause congestion in radio channels, and thus a V2X message transmitted by a certain vehicle is highly likely not to be received by other vehicles.

Thus, in this regard, it is required to reduce the number of V2X messages transmitted by each vehicle to prevent the channel congestion and manage the QoS of the V2X communication. That is, since vehicles move at low speeds in a congested area, locations, speeds, and directions of the vehicles, which are included in CAM/DeNM messages, are rarely changed. Thus, even if some messages are deleted, it does not significantly affect the traffic safety.

With reference to FIG. 12, a case in which a UE receives V2X resource use information as described above with reference to FIG. 11, and a V2X message TX frequency parameter included in V2X resource use frequency indicates 'No Limit' [S1210] will be described. That is, this corresponds to a case in which an eNB determines that the current cell has sufficient resources. Since there is no limit on the number of messages transmitted in a unit time, the UE creates V2X messages and then transmits the V2X messages through its AS/NAS layer [S1220]. The AS/NAS layer checks the V2X message TX frequency and then knows that there is no limit. Thus, all the V2X messages generated in a V2X application could be transmitted through the AS/NAS layer.

Thereafter, a case in which the UE receives new V2X resource use information, and the received new V2X resource use information indicates, as the V2X message TX frequency parameter, that there are three messages in every one second [S1230] will be described. That is, this corresponds to a case in which the eNB limits the number of V2X messages transmitted in one second to three after determining that resources are insufficient. The AS/NAS layer of the UE checks the V2X message TX frequency and does not transmit more than three V2X message in one second according to the limitation. Specifically, whenever the V2X message is received from the higher layer, the AS/NAS layer checks how many V2X messages have been transmitted during the last one second. If three V2X messages are already transmitted during the last one second, the AS/NAS layer of the UE does not transmit V2X messages delivered from the V2X application but discard the V2X message [S1240]. This process is performed whenever the V2X message is received from the higher layer. If three V2X messages are not transmitted during the last one second, the AS/NAS layer transmits the delivered V2X messages [S1240].

With reference to FIG. 13, a case in which a UE receives V2X resource use information as described above with reference to FIG. 12, and a V2X message TX frequency parameter included in V2X resource use frequency indicates 'No Limit' [S1310a] will be described as another example. A UE's AS/NAS layer delivers the received V2X message TX frequency parameter to a V2X application [S1310b]. The V2X application checks that there is no limit on the number of V2X message that can be transmitted and then request the AS/NAS layer to transmit all the generated V2X messages by delivering the V2X messages to the AS/NAS layer. The AS/NAS layer transmits all the delivered V2X messages [S1220].

Thereafter, the UE receives new V2X resource use information, and the new V2X resource use information indicates, as the V2X message TX frequency parameter, that the number of V2X message that can be transmitted during one second is limited to up to three [S1330a]. The UE delivers the received V2X message TX parameter to the V2X application [S1330b].

Based on the received information, the V2X application does not perform a process for requesting the AS/NAS layer to transmit the V2X message more than three times during one second [S1340]. That is, after recognizing that the number of V2X messages that can be transmitted by the V2X application is limited, the V2X application checks how many V2X messages have been transmitted during the last one second before generating a new V2X message or requesting transmission thereof. If three V2X messages or more are transmitted during the last one second, the V2X application does not generate an additional V2X message or request transmission thereof. If there are generated V2X messages, they are discarded. On the other hand, if less than three V2X messages are transmitted during the last one second, the V2X application request to the lower layer to transmit the generated V2X messages.

In the conventional Internet communication services, information on the service quality and limitation have been expressed in the unit of bps. This is because the conventional Internet services have a short transmission delay and a large amount of transmission data. For example, in the case of Internet web page searching, it requires transmission within one second, and in the case of a streaming service, a large amount of data is transmitted. Thus, it may be considered as a proper standard that transmission limitation conditions are made using the unit of bps. However, in the case of the recently used IoT and V2X UEs, situations are changed. Specifically, in the case of an IoT UE, only several messages are generated in one day, and a small amount of data is transferred due to battery limitation. It would be inappropriate to impose transmission limitations on such a UE using the unit of bps. In addition, from perspective of an eNB, if the eNB allocates radio resources to the IoT UE with a low bps during a long time, it is inappropriate because power consumption of the IoT UE may be increased. In this regard, if a certain number of messages are used within a prescribed time, it could be considered to be more appropriate. As described above, it is possible to manage QoS by adjusting the number of messages transmitted within a prescribed time not only in the IoT environment but also in the V2X environment.

Additionally, each of the values and parameters included in the above-mentioned V2X resource use information may be differently configured and applied according to vehicle types. For example, in the case of special purpose vehicles such as an ambulance, a police vehicle, etc., more transmission opportunities should be given compared to normal vehicles. Accordingly, the network entity can transmit different parameters according to the vehicle types, and each vehicle can receive information that matches its type and purpose and then operate according to the information.

4. Device Configurations

Figure 14:
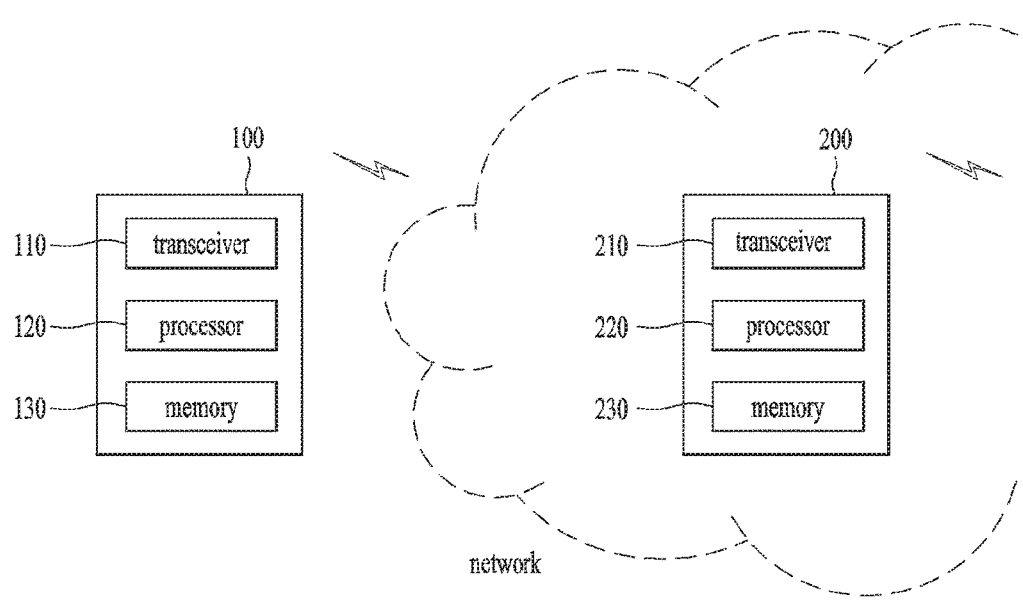
FIG. 14 is a diagram illustrating a configuration of a node device according to a proposed embodiment.

FIG. 14 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 14, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned V2X communication method is applicable to various wireless communication systems including an IEEE 802.16x system and an IEEE 802.11x system as well as to a 3GPP system. Moreover, a proposed method is applicable to an mmWave communication system that uses an ultra-high frequency band.

What is claimed is:

1. A method for performing communication with a network entity by a user equipment (UE) in a wireless communication environment, the method comprising:
receiving control information indicating a transmission rate of messages for controlling Access Point Name (APN) rate by a Non-Access Stratum (NAS) signaling;
generating and transmitting one or more messages during a time interval by limiting the number of the one or more messages to less than or equal to a maximum number indicated by the control information.

2. The method of claim 1, wherein limiting the number of the one or more messages is less than or equal to the maximum number indicated by the control information comprises:
when a new message is generated, checking the number of messages that have been transmitted during the time interval;
when the checked number of messages is less than the maximum number indicated by the control information, transmitting the new message; and
when the checked number of messages is equal to the maximum number indicated by the control information, deleting the new message.

3. The method of claim 1, further comprising delivering the received control information to an application,
wherein the application does not generate a new message any more, when the number of generated messages is equal to the maximum number indicated by the control information.

4. The method of claim 1, wherein the control information further includes information of a speed standard where the control information will be applied.

5. The method of claim 1, wherein when the UE is configured to use, among controlled allocation resources and autonomously selected resources, the autonomously selected resources, the control information is received.

6. The method of claim 1, wherein the messages are V2X (vehicle to everything) messages generated in a V2X application,
wherein the information is V2X information, and
wherein the UE performs V2X communication with the network entity.

7. The method of claim 1, wherein the APN rate corresponds to a data rate of V2X (vehicle to everything) application.

8. A user equipment (UE) for performing communication with a network entity in a wireless communication environment, the UE comprising:
a transmitter;
a receiver; and
a processor connected to the transmitter and the receiver, wherein the processor is configured to:
receive control information indicating transmission rate of messages for controlling Access Point Name (APN) rate by a Non-Access Stratum (NAS) signaling;
generate and transmit one or more messages during the time interval by limiting the number of the one or more messages to less than or equal to the maximum number indicated by the control information.

9. The UE of claim 8, wherein the processor limits the number of the one or more messages to less than or equal to the maximum number indicated by the control information comprises:
when a new message is generated, the processor checks the number of messages that have been transmitted during the time interval;
when the checked number of the messages is less than the maximum number indicated by the control information, the processor transmits the new message; and
when the checked number of the messages is equal to the maximum number indicated by the control information, the processor deletes the new message.

10. The UE of claim 8, wherein the processor is configured to deliver the received control information to an application, and
wherein when the number of the generated messages is equal to the maximum number indicated by the control information, the application does not generate a new message any more.

11. The UE of claim 8, wherein the control information further includes information of a speed standard where the control information will be applied.

12. The UE of claim 8, wherein when the UE is configured to use, among controlled allocation resources and autonomously selected resources, the autonomously selected resources, the control information is received.

13. The UE of claim 8, wherein the messages are V2X (vehicle to everything) messages generated in a V2X application, wherein the information is V2X information, and wherein the UE performs V2X communication with the network entity.

14. The UE of claim 8, wherein the APN rate corresponds to a data rate of V2X (vehicle to everything) application.

* * * * *